(12) United States Patent
Hranica et al.

(10) Patent No.: US 7,086,518 B1
(45) Date of Patent: Aug. 8, 2006

(54) METHOD OF SUPPLYING WORKPIECES TO WORKSTATIONS USING AN AUTOLOADER

(75) Inventors: Jim Hranica, Tipp City, OH (US); Yasunori Yamazaki, Sidney, OH (US); Scott Costello, Kettering, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/612,755

(22) Filed: Jul. 3, 2003

(51) Int. Cl.
*B65G 43/08* (2006.01)

(52) U.S. Cl. .......................... 198/341.03; 198/341.07; 198/349.6; 700/229; 700/112; 700/121

(58) Field of Classification Search .......... 198/341.03, 198/341.05, 341.07, 358, 349.6; 414/222.02; 700/112, 115, 121, 229
See application file for complete search history.

(56) References Cited

U.S. PATENT DOCUMENTS

| | | | |
|---|---|---|---|
| 3,703,725 A * | 11/1972 | Gomersall et al. .......... | 198/358 |
| 4,031,368 A | 6/1977 | Colding et al. | |
| 4,506,999 A | 3/1985 | Robertson | |
| 4,550,375 A | 10/1985 | Sato et al. | |
| 4,709,337 A | 11/1987 | Knapp et al. | |
| 4,754,906 A | 7/1988 | Brovold | |
| 4,838,411 A | 6/1989 | Rainey et al. | |
| 4,931,709 A | 6/1990 | Ikeda et al. | |
| 4,991,281 A | 2/1991 | Ikeda et al. | |
| 5,189,624 A | 2/1993 | Barlow et al. | |
| 5,193,662 A | 3/1993 | McCulloch et al. | |
| 5,202,836 A | 4/1993 | Iida et al. | |
| 5,270,627 A | 12/1993 | Rehse | |
| 5,524,748 A | 6/1996 | McTaggart | |
| 5,946,790 A | 9/1999 | Graham et al. | |
| 5,966,307 A | 10/1999 | Lin | |
| 5,971,130 A | 10/1999 | Nakamura | |
| 6,205,761 B1 | 3/2001 | Wassenhoven et al. | |
| 6,324,749 B1 | 12/2001 | Katsuura et al. | |
| 6,467,605 B1 * | 10/2002 | Head, III ............... | 198/341.07 |
| 6,502,294 B1 | 1/2003 | Kusmierczyk et al. | |
| 6,564,440 B1 | 5/2003 | Oldford et al. | |
| 6,580,971 B1 | 6/2003 | Bunn et al. | |
| 6,662,076 B1 * | 12/2003 | Conboy et al. ............. | 700/214 |
| 6,813,540 B1 * | 11/2004 | Scotti et al. ................ | 700/216 |
| 2002/0138172 A1 * | 9/2002 | Bahri et al. ................. | 700/217 |

* cited by examiner

*Primary Examiner*—Gene O. Crawford
*Assistant Examiner*—Mark A. Deuble
(74) *Attorney, Agent, or Firm*—Rankin, Hill, Porter & Clark LLP; Vincent Ciamacco

(57) ABSTRACT

A method of controlling an autoloader that supplies workpieces to a plurality of workstations. Each of the workstations is operable to generate and transmit a call signal, a ready signal and an error signal. In accordance with the method, the autoloader supplies workpieces to the workstations based on the chronological order of the receipt of call signals from the workstations. If an error signal is received from a workstation that is to be supplied with a workpiece, the autoloader instead supplies the workpiece to the next workstation that is to be supplied.

21 Claims, 9 Drawing Sheets

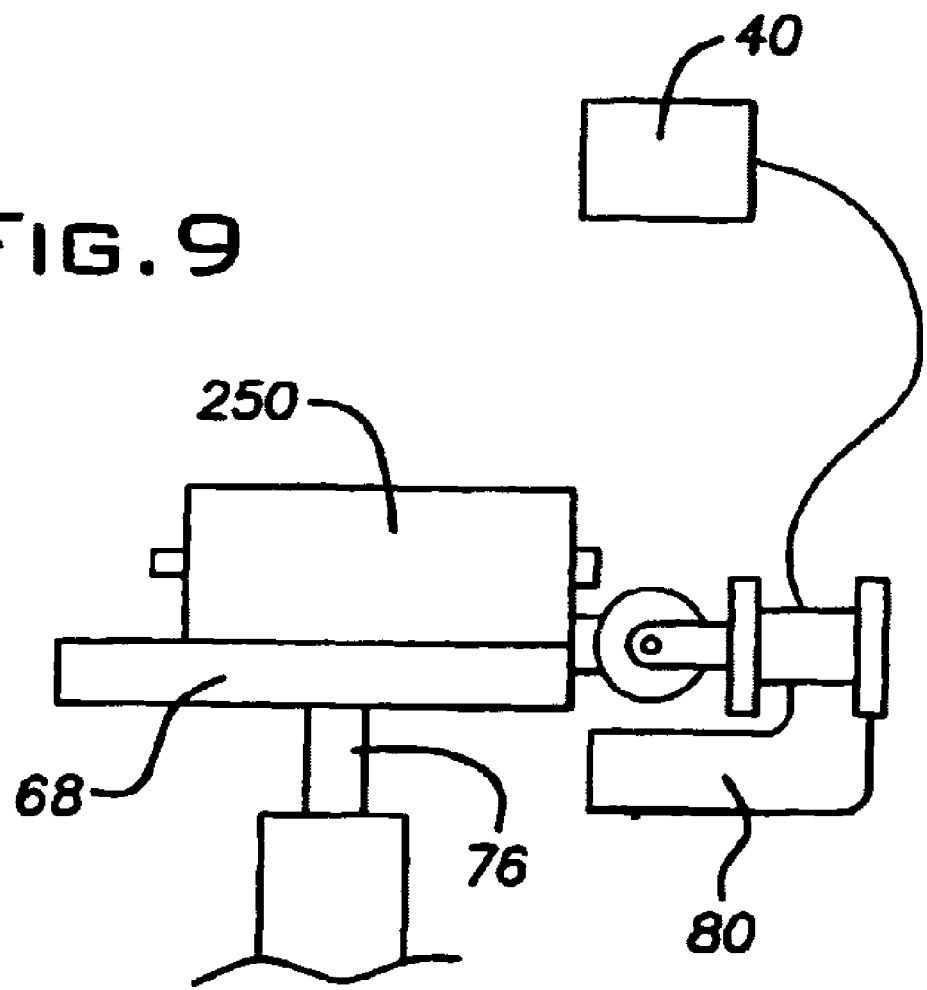

METHOD OF SUPPLYING WORKPIECES TO WORKSTATIONS USING AN AUTOLOADER

BACKGROUND OF THE INVENTION

The present invention relates to workpiece conveyance apparatus and more specifically to a method of supplying workpieces to workstations using an autoloader.

Workpiece conveyance apparatus are commonly used in manufacturing facilities to transfer workpieces to and from workstations and/or between workstations within a manufacturing process. One particular type of workpiece conveyance apparatus that is used is an apparatus known as an autoloader. An autoloader typically includes a conveyance apparatus with a gripping device that is mounted to a guidance structure and is movable along the length of the guidance structure. The gripping device is operable to load and unload workpieces to and from workstations.

Autoloaders are commonly used in a machining line, wherein a sequence of machining operations are performed on a workpiece by different types of workstations. Usually, a plurality of workstations for performing a particular machining operation are provided. An example of a machining line that uses autoloaders is the machining line for a crankshaft, wherein a raw or unfinished crankshaft from a casting operation is subjected to a series of turning, grinding, tapping, drilling and polishing operations.

Conventionally, a machining line often includes one or more sub-lines, wherein a single autoloader is used to supply workpieces to workstations that perform different machining operations. In such a mixed operation sub-line, when a workstation for a particular machining operation stops for any reason, the entire sub-line stops. Moreover, the sub-line cycle time is limited to the longest operation cycle time. In order to remedy this inefficiency, a machining line has been developed, wherein the machining line includes a plurality of zones or segments dedicated to a particular machining operation. In each such segment, an autoloader moves workpieces to and from a plurality of workstations that perform the same operation. For a particular zone having workstations MC1, MC2, MC3, the autoloader is controlled to supply workpieces to the workstations in the fixed sequence MC1, MC2, MC3, which is continuously repeated, eg. MC1, MC2, MC3, MC1, MC2, MC3, etc. With this control scheme, the cycle time of the segment is dependent upon the workstation with the longest cycle time. Moreover, if one of the workstations stops (because of a fault or otherwise), the autoloader stops.

Accordingly, there is a need in the art for a more efficient method of supplying workpieces to workstations using an autoloader. The present invention is directed to such a method.

SUMMARY OF THE INVENTION

In accordance with the present invention, a method is provided for supplying workpieces to a plurality of workstations. Each of the workstations is operable to generate and transmit a call signal and an error signal. In accordance with the method, all call and error signals transmitted from the workstations are received. Each of the workstations that transmits a call signal and not an error signal is supplied with one of the workpieces. The workpieces are supplied to the workstations based on the chronological order of the receipt of the call signals from the workstations, such that the workstation that transmits a first received one of the call signals is supplied with one of the workpieces first. After a workpiece has been moved from an input area to one of the workstations that transmitted a call signal, a determination is made whether the workstation has transmitted an error signal. If the workstation has transmitted an error signal, the workpiece is moved to the workstation that transmitted the next-received call signal.

BRIEF DESCRIPTION OF THE DRAWINGS

The features, aspects, and advantages of the present invention will become better understood with regard to the following description, appended claims, and accompanying drawings where:

FIG. 9 is a schematic view of a drop-off station adjacent to a stamping machine.

DETAILED DESCRIPTION OF THE PREFERRED EMBODIMENTS

Figure 1:
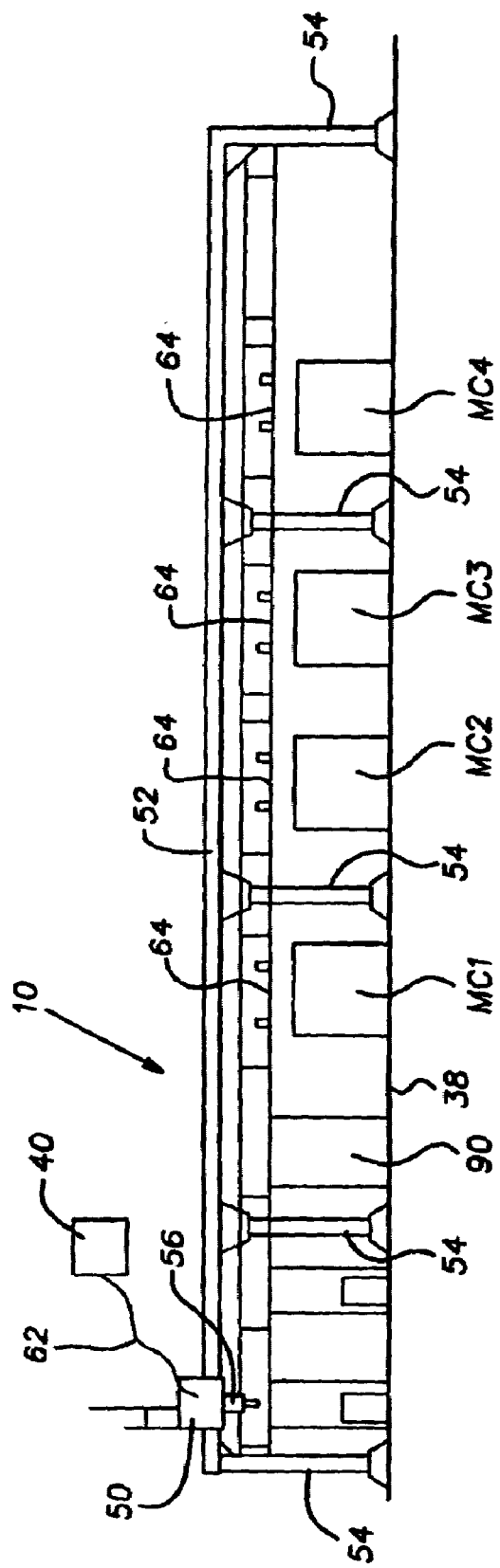
FIG. 1 shows a side elevational view of an autoloader.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

As used herein, the term "chronological order" shall mean the order in which events occur, beginning with the oldest event first and ending with the most current event.

The present invention is directed to a method of controlling a workpiece conveyance apparatus that is operable to move workpieces to and from a plurality of workstations in a manufacturing process. The conveyance apparatus may be an autoloader, such as an autoloader 10 shown best in FIG. 1. The autoloader 10 is operable to move workpieces to and from a plurality of workstations MC1, MC2, MC3, MC4 and to load and unload the workpieces into and from the workstations MC1–MC4. The workstations MC1–MC4 may be machines grouped in a zone 20 of a machining line 22, such as a machining line for producing automotive crankshafts. In such an application, the workpieces are automotive crankshafts and the workstations MC1–MC4 in the zone 20 perform machining operations on the crankshafts. Preferably, the workstations MC1–MC4 all perform the same machining operation. For purposes of illustration, the workstations MC1–MC4 may all be drilling machines for drilling cross oil passage holes in a crankshaft. It should be appreciated, however, that the present invention is not limited to a particular operational environment, such as a crankshaft machining line, but rather has numerous applications, as will be understood by those of skill in the art.

Figure 2:
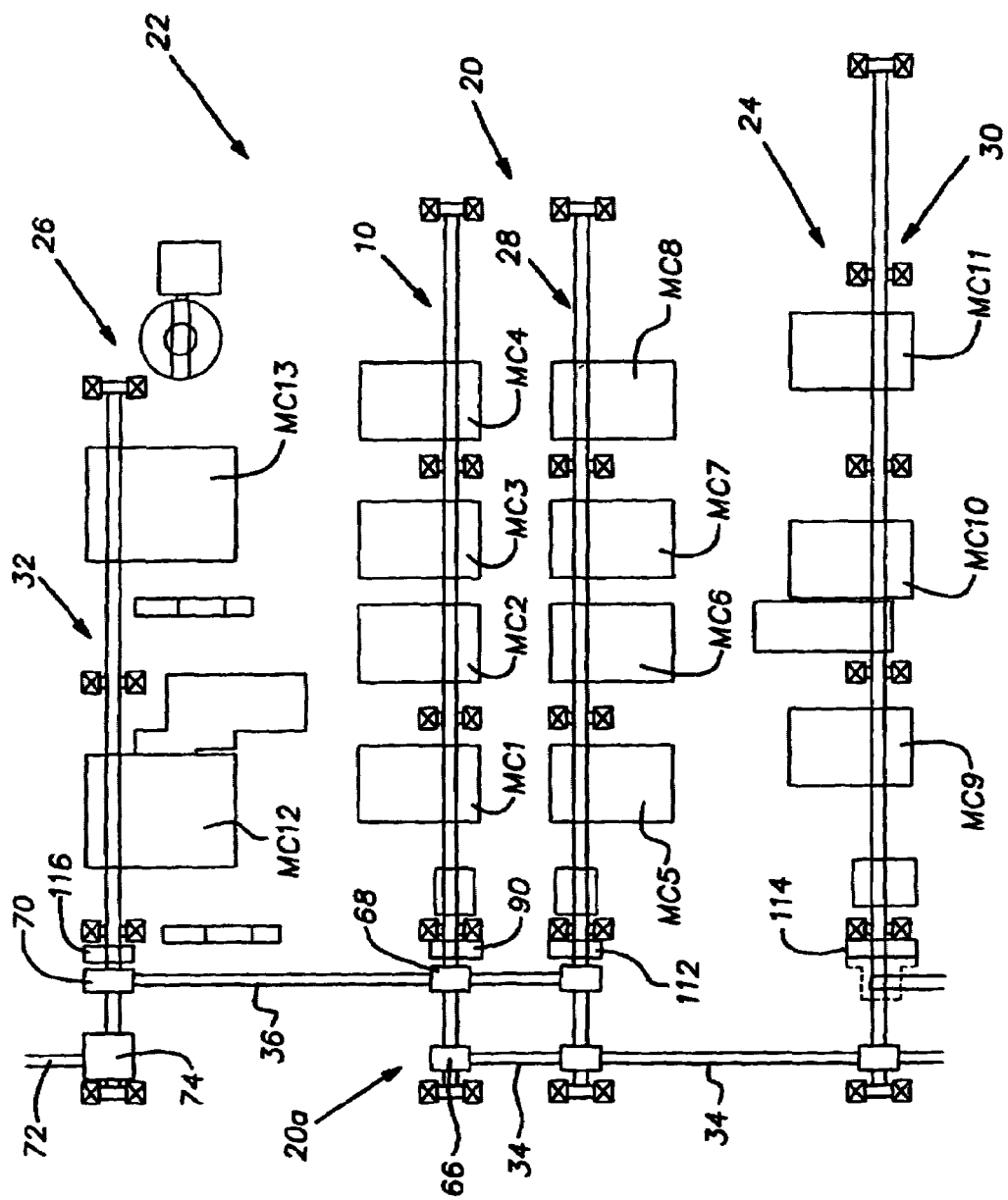
FIG. 2 shows a top plan view of a portion of a machining line including the autoloader.

Referring now to FIG. 2, the machining line 22 includes a plurality of zones in addition to the zone 20. For purposes of brevity, however, only a portion of the zones are shown. More specifically, only the zone 20 and a preceding zone 24 and a following zone 26 are shown. As set forth above, the zone 20 includes the autoloader 10, which services workstations MC1–MC4. The zone 20, however, also includes a second autoloader 28 and workstations MC5, MC6, MC7 and MC8. The preceding and following zones 24, 26 include autoloaders 30, 32 respectively, and the other zones each have at least one autoloader, as well. The autoloaders 28, 30, 32 and the other autoloaders have substantially the same construction and operation as the autoloader 10, whose construction and operation will be discussed in more detail below. The zone 20 is connected to the preceding zone 24 by an input conveyor 34 and is connected to the following zone 26 by an output conveyor 36. The input conveyor 34 is operable to support and carry workpieces that have been worked upon in the preceding zone 24 to the zone 20, whereas the output conveyor 36 is operable to support and carry workpieces that have been worked upon in the zone 20 to the following zone 26. The workpieces are preferably disposed on pallets when they are carried by the input and output conveyors 34, 36.

The input and output conveyors 34, 36 may be conventional roller conveyors supported above a floor 38. In addition to moving workpieces, the input and output conveyors 34, 36 act as buffers to hold workpieces. For example, if all or a portion of zone 20 is taken down for maintenance or other reasons, the output conveyor 36 should have sufficient capacity to hold workpieces from zone 20 to continue feeding the workpieces to following zone 26. In this manner, the downtime on zone 20 will have minimum impact on following zone 26. Since the capacity to hold workpieces is determined by the lengths of the input and output conveyors 34, 36, the lengths of the input and output conveyors 34, 36 are selected to provide a desired amount of buffering.

As set forth above, the machining line 22 may produce automotive crankshafts and in accordance therewith, the workstations M1–M8 in zone 20 may all be drilling machines for drilling cross oil passage holes in a crankshaft. In such an application, the preceding zone 24 may include a plurality of workstations MC9, MC10, MC11, which are gundrill machines for drilling slant oil passage holes, and the following zone 26 may include a plurality of workstations MC12, MC13, which are multiwheel grind machines for grinding main journals and post ends of a crankshaft.

When a workpiece moves through the machining line 22, only one workstation in a zone works on the workpiece. After the workpiece is worked on in a zone by one of the workstations located therein, the workpiece is then moved to a succeeding zone, where the workpiece is worked on by one of the workstations located therein. This procedure continues until the workpiece travels through the entire machining line 22 and is thereby finished. Thus, with regard to the portion of the machining line shown in FIG. 2, a workpiece is worked on by one of the workstations MC9, MC10, MC11 in the preceding zone 24 and then is moved by the autoloader 30 and the input conveyor 34 to the zone 20. In zone 20, the workpiece is worked on by one of the workstations MC1–MC8 and then is moved by the autoloader 10 or the second autoloader 28 and the output conveyor 36 to the following zone 26. In the following zone 26, the workpiece is worked on by one of the workstations MC12 and MC13 and then is moved to the next zone.

Each of the workstations MC1–M13 and the other workstations in the machining line 22 is operable to generate a call signal indicating that the workstation is ready to receive and work upon a workpiece (crankshaft). Each of the workstations MC1–M13 and the other workstations in the machining line 22 is also operable to generate an error signal indicating that there is a problem with the workstation or the workstation is off-line and that a workpiece (such as a crankshaft) should not be loaded into the workstation. A control system 40 for the autoloader 10 is electrically connected by wiring (not shown) to the workstations MC1–MC4 and is operable to receive the call and error signals from the workstations MC1–MC4. As will be discussed further below, the control system 40 uses the call and error signals to control the operation of the autoloader 10.

In the zone 20, the workstations MC1–MC8 are spaced apart and arranged in a pair of lines. Similarly in the preceding zone 24, the workstations MC9–11 are spaced apart and arranged in a line, and in the following zone 26, the workstations MC12, MC13 are spaced apart and arranged in a line. The zone 20, the preceding zone 24 and the following zone 26 are arranged in a parallel, and spaced-apart manner. Thus, the input and output conveyors 34, 36 extend in perpendicular fashion between the preceding zone 24 and the zone 20 and the zone 20 and the following zone 26, respectively. The input and output conveyors 34, 36 are disposed relatively close to each other, toward a conveyor end 20a of the zone 20.

Figure 3:
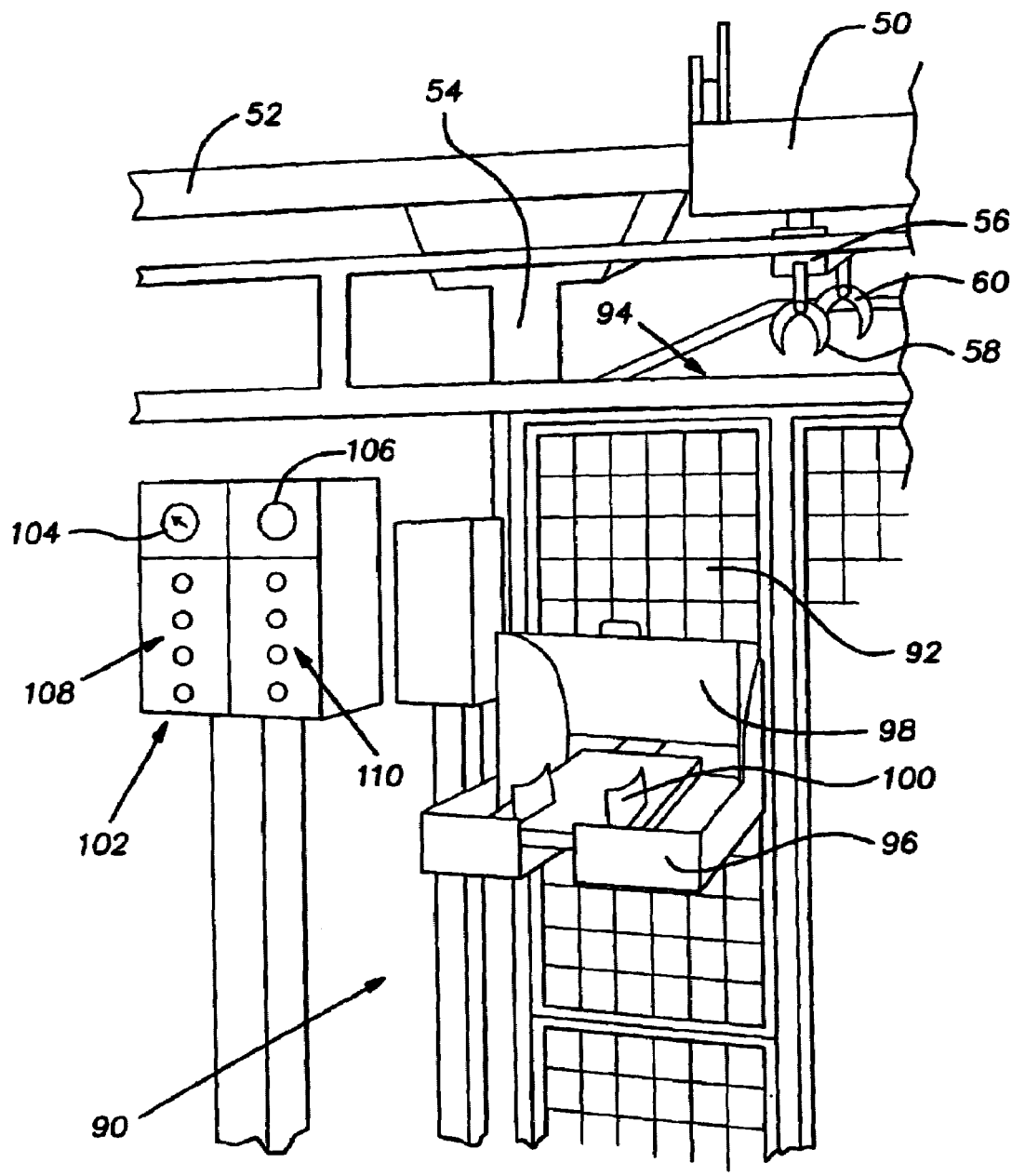
FIG. 3 shows a perspective view of a portion of the autoloader and a quality control station.

Referring back to FIG. 1 and now also to FIG. 3, the autoloader 10 includes a carriage 50 that is mounted to, and movable along, a guidance structure that defines a path of travel between the workstations MC1–MC4. The guidance structure can include at least one rail, such as an overhead monorail 52 supported on pillars 54 extending upwardly from the floor 38, as shown. Alternately, the monorail 52 can be suspended from a ceiling. The carriage 50 is moved along the monorail 52 by a servomotor (not shown). The carriage 50 is provided with a lowerator 56 for loading and unloading workpieces to and from the workstations MC1–MC4. The lowerator 56 is driven by pneumatic cylinders or other drive means to vertically move between an upper or travel position and a lower or servicing position. The lowerator 56 includes a pair of grippers 58, 60 for holding workpieces. The carriage 50 is connected to the control system 40 by wiring 62. As will be discussed further below the control system 40 is operable to control the movement of the carriage 50 along the monorail 52 and to control the movement and operation of the lowerator 56 and the grippers 58, 60.

The monorail 52 is spaced above and extends over the workstations MC1–MC4. Since the workstations MC1–MC4 are arranged in a line, the monorail 52 is linear. It should be appreciated, however, that if the workstations MC1–MC4 are arranged in a different configuration, the monorail 52 will have a correspondingly different configuration, as well. Each workstation MC1–MC4 has an entrance area that faces upwardly toward the monorail 52. As will be described further below, workpieces are loaded into the workstations MC1–MC4 by the lowerator 56 through the entrance areas. At each of the workstations MC1–MC4, a shutter door 64 is disposed between the monorail 52 and the entrance area of the workstation. Each shutter door 64 is movable between a closed position, wherein the shutter door 64 is disposed between the monorail 52 and the entrance area, and an open position, wherein the shutter door 64 is not disposed between the monorail 52 and the entrance area. When the shutter door 64 of one of the workstations MC1–MC4 is in the closed position, the shutter door 64 prevents the lowerator 56 from entering the workstation through the entrance area. Each shutter door 64 is provided with a set of electrical contacts that are electrically connected to the control system 40 for the autoloader 10. The electrical contacts are operable to provide the control system 40 with control signals that inform the control system 40 whether the shutter door 64 is open or closed.

Referring back to FIG. 2, at the end of the input conveyor 34 is a first input area 66, which is a vertically-movable substrate from which the autoloader 10 obtains workpieces for loading into the workstations MC1–MC4. At the end of the output conveyor 36 is a second input area 70, which is a vertically-movable substrate from which the autoloader 32 obtains workpieces for loading into the workstations MC12 and MC13. The first and second input areas 66, 70 are each moved by a pneumatic cylinder or other lift means. It should be noted that the other zones in the machining line 22 also have one or more input areas from which the autoloader(s) in the zones obtain workpieces.

At the beginning of the output conveyor 36 is a drop-off station 68. Similarly, at the beginning of an ouput conveyor 72 for the following zone 26 is a second drop-off station 74. Drop-off station 68 is a vertically-movable substrate upon which workpieces from the workstations MC1–MC4 are deposited by the autoloader 10, while second drop-off station 74 is a vertically-movable substrate upon which workpieces from the workstations MC12 and MC13 are deposited by the autoloader 32. It should be noted that the other zones in the machining line 22 also have one or more drop-off stations for receiving workpieces from the autoloader(s) in the zones.

Referring now also to FIG. 9, the drop-off station 68 is moved by a pneumatic cylinder 76 or other lift means. The drop-off station 68 is movable between a lowered position and a raised position. When the drop-off station 68 is moved to the lowered position, a workpiece (such as a crankshaft 250) disposed on the drop-off station 68 moves onto the output conveyor 36. When the drop-off station 68 is in the raised position, a workpiece disposed on the drop-off station 68 is accessible by a stamping machine 80. Although not shown, the second drop-off station 74 and the other drop-off stations in the machining line 22 have the same or substantially the same construction as the drop-off station 68 and are accessible by stamping machines (having the same or substantially the same construction as the stamping machine 80) or other type of marking device. For example, in lieu of a stamping machine, a zone may have a drill that marks the workpiece with small holes.

The stamping machine 80 is preferably a pneumatic pin marking machine, such as is available from Telesis Controls Corporation. The stamping machine 80 may be constructed in accordance with U.S. Pat. No. 4,506,999, which is hereby incorporated by reference. The stamping machine 80 uses an array of pneumatically driven marker pins to make a plurality of indentations in a workpiece so as to form a stamp or mark. The stamping machine 80 is operatively connected to the control system 40 for receiving command signals therefrom. The stamping machine 80 is operable to form a mark for each of the workstations MC1–MC4. As will be discussed further below, when the autoloader 10 moves a workpiece from one of the workstations MC1–MC4 to the drop-off station 68, the stamping machine 80 stamps the workpiece with a mark identifying the workstation. Similarly, when the autoloader 32 moves a workpiece from one of the workstations MC12 and MC13 to the second drop-off station 74, the stamping machine disposed adjacent thereto stamps the workpiece with a mark identifying the worksta-tion. This same procedure occurs at each of the drop-off stations in the machining line 22 having a stamping machine.

A quality control (QC) station 90 is located toward the output conveyor 36, near the drop-off station 68. Referring now to FIG. 3, the QC station 90 includes a cage 92 defining an interior space 94 for receiving the lowerator 56 of the carriage 50. A tray 96 with pivotable cover 98 is secured to a front wall of the cage 92. A workpiece jig 100 is movably mounted to the cage 92 and is movable between a retracted position, wherein the workpiece jig 100 is disposed in the interior space 94 of the cage 92, and an extended position, wherein the workpiece jig 100 is disposed in the tray 96. When the workpiece jig 100 is in the retracted position, the workpiece jig 100 is positioned to receive a workpiece from the lowerator 56. The workpiece jig 100 is constructed to hold a workpiece, such as a crankshaft.

Figure 4:
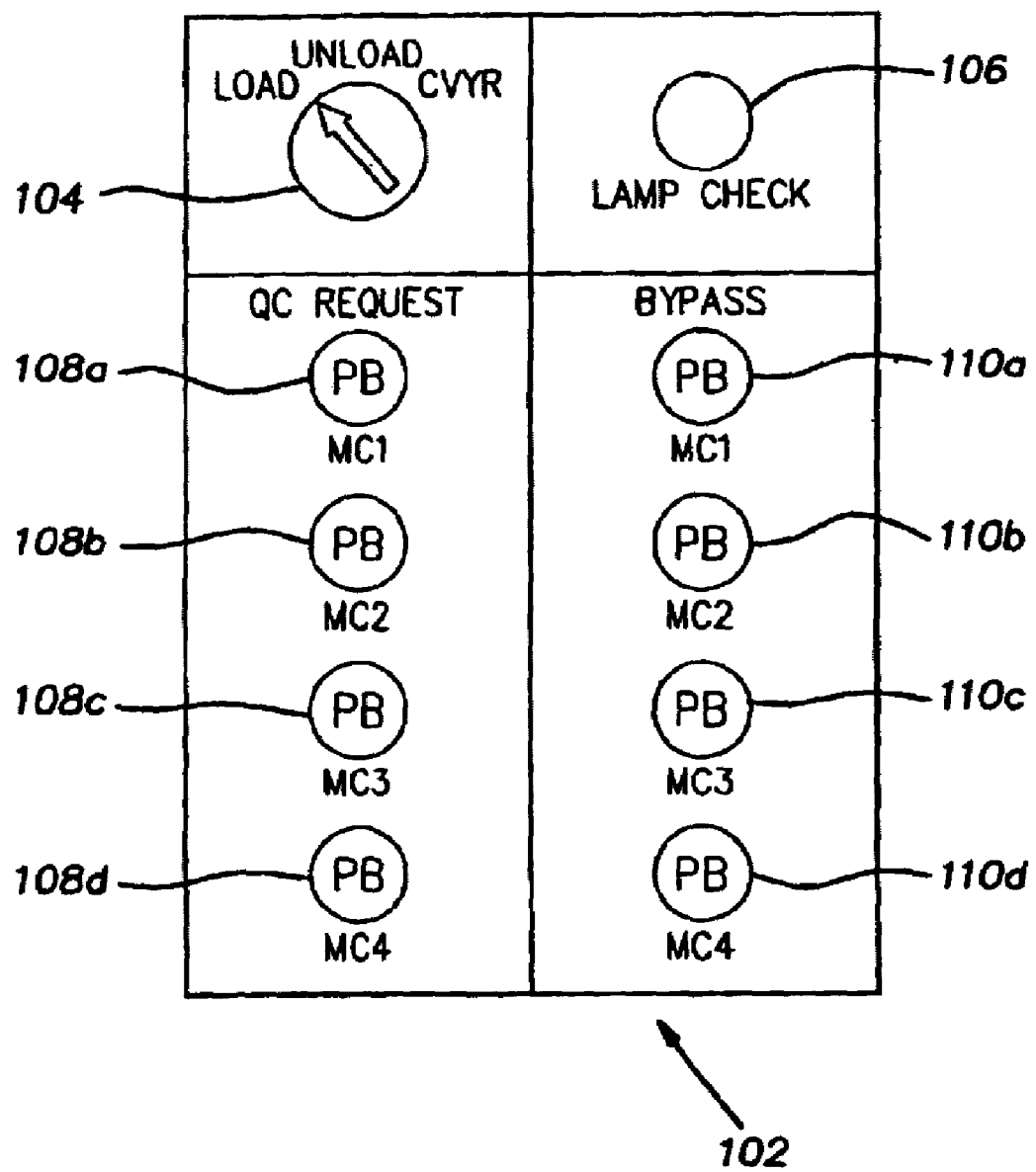
FIG. 4 shows a front view of a control panel for the quality control station.

Referring now also to FIG. 4, a quality control (QC) panel 102 is disposed proximate to the QC station 90. The QC panel 102 includes a plurality of operator interface devices in the form of a main selector switch 104, a lamp check light 106, a plurality of lighted request pushbuttons 108a, 108b, 108c, 108d and a plurality of lighted bypass pushbuttons 110a, 110b, 110c, 110d. The operator interface devices are electrically connected to the control system 40 by wiring (not shown) and are operable to transmit control signals to the control system 40 in response to manipulation by an operator, as will be further described below. The main selector switch 104 is operable to select a desired QC function and is movable between a "LOAD" position, an "UNLOAD" position and a "CVYR" position. The request pushbuttons 108a–d are operable for selecting the workstation for which the QC function is desired, while the bypass pushbuttons 110a–d are operable for putting a desired workstation in a bypass mode.

The main selector switch 104 operates in conjunction with the request pushbuttons 108a–d to generate QC signals for the workstations MC1–MC4. For example, when the main selector switch 104 is set to the LOAD position and the request pushbutton 108a for MC1 is depressed, a workstation load signal is generated for MC1 and transmitted to the control system 40. When the main selector switch 104 is set to the UNLOAD position and the request pushbutton 108b for workstation MC2 is depressed, a workstation unload signal is generated for workstation MC2 and transmitted to the control system 40. When the main selector switch 104 is set to the CVYR position and the request pushbutton 108c for workstation MC3 is depressed, a drop-off signal is generated for workstation MC3 and transmitted to the control system 40.

The control system 40 uses the workstation load signal, the workstation unload signal and the drop-off signal to control the autoloader 10 to move workpieces to and from the QC station 90, as will be discussed in more detail below. Briefly, however, when a workstation load signal is received for, say workstation MC1, the control system 40 controls the autoloader 10 such that the autoloader 10 completes its current cycle and then picks up a workpiece from the QC station 90 and moves it to workstation MC1. When a workstation unload signal is received for, say workstation MC2, the control system 40 controls the autoloader 10 such that the autoloader 10 completes its current cycle and then picks up a workpiece from workstation MC2 and moves it to the QC station 90. When a drop-off signal is received for, say workstation MC3, the control system 40 controls the autoloader 10 such that the autoloader 10 completes its current cycle and then picks up a workpiece from the QC station 90 and moves it to the drop-off station 68, where the workpiece is stamped by the stamping machine 80 with a mark indicating that the workpiece was worked on by workstation MC3, as will be described more fully below.

When the control system 40 receives a workstation load signal or a workstation unload signal for one of the workstations MC1–MC4, the control system 40 places the workstation in a bypass mode, which is indicated by a flashing light on the lighted bypass pushbutton 110 for the workstation. When one of the workstations MC1–MC4 is in the bypass mode, an error signal is generated for the workstation and transmitted to the control system 40. As will be described further below, when the control system 40 receives an error signal from one of the workstations MC1–MC4, the control system 40 removes the workstation from the autoloader supply routine 120, i.e., the control system 40 controls the autoloader 10 so that it will not supply workpieces to the workstation.

Each of the workstations MC1–MC4 can also be placed in the bypass mode by depressing the bypass pushbutton 110 for the workstation. After one of the workstations MC1–MC4 is placed in the bypass mode by either the control system 40 or by the depression of its bypass pushbutton 110, the workstation stays in the bypass mode until the operator restarts the workstation. If the workstation was placed in the bypass mode for an inspection of one the workpieces the workstation worked on, the operator typically does not restart the workstation until after the operator verifies the quality of the workpiece.

The foregoing control scheme is used to inspect workpieces for quality control purposes. For example, if an operator desires to check the quality of the operation performed by workstation MC1, the operator moves the workpiece jig 100 to the retracted position, then moves the main selector switch 104 to "UNLOAD" and depresses the request pushbutton 108a for MC1. In response, the autoloader 10 completes its current cycle and then delivers a workpiece that has been worked upon in workstation MC1 to the workpiece jig 100 at the QC station 90. The workstation MC1 is then placed in the bypass mode by the control system 40. The operator then moves the workpiece jig 100 to the extended position and opens the cover 98. The operator may inspect the workpiece while it is being held by the workpiece jig 100, or, more preferably, the operator may inspect the workpiece outside the tray 96 on a stand alone jig (not shown). The operator preferably uses a hoist (not shown) located outside the cage 92 to move the workpiece to the stand alone jig. When the workpiece is situated in the desired inspection location, the operator inspects the workpiece, such as for compliance with certain specifications. If the workpiece passes the inspection (such as by fully meeting the specifications), the operator loads the workpiece back into the workpiece jig 100 and moves the work piece jig 100 to the retracted position. The operator then moves the main selector switch 104 to the "CVYR" position and depresses the request pushbutton 108a for workstation MC1. In response, the autoloader 10 completes its current cycle and then delivers the inspected workpiece to the drop-off station 68, where it is stamped with a mark indicating that the workpiece was worked on by workstation MC1. The operator then restarts the MC1 workstation to take it out of the bypass mode.

If the workpiece does not pass inspection (such as by not meeting the specifications), but the operator believes that the workpiece can pass inspection if the workpiece is reworked in MC1 (or another desired workstation), the operator loads the workpiece back into the workpiece jig 100 and moves the work piece jig 100 to the retracted position. The operator then moves the main selector switch 104 to the "LOAD" position and depresses the request pushbutton 108a for workstation MC1 (or the request pushbutton for the other desired workstation). In response, the autoloader 10 completes its current cycle and then returns the inspected workpiece back to workstation MC1 (or delivers it to the other desired workstation), where it is reworked.

If, from inspection, the operator determines that the workpiece does not meet the specifications and cannot be reworked, the operator simply moves the workpiece to a scrap area (not shown).

Wherever practical, a quality control (QC) station is provided for each of the other autoloaders in the machining line 22. In this manner, most zones in the machining line 22 have at least one QC station. If the nature of a zone or sub-zone serviced by an autoloader is such that a workpiece can easily be inspected on an output conveyor and the workpiece will not be returned to the zone or sub-zone for rework, a QC station is not provided for the autoloader in the zone or sub-zone. For each of the autoloaders in the zones and sub-zones having a QC station, the QC station is preferably located toward a conveyor end of the autoloader, i.e., the end of the autoloader disposed next to input and output conveyors.

With regard to the portion of the machining line 22 shown in FIG. 2, a QC station 112 is provided for the second autoloader 28, while a QC station 114 is provided for the autoloader 30 in the preceding zone 24 and a QC station 116 is provided for the autoloader 32 in the following zone 26. The QC stations 112–116 to and the other QC stations in the machining line 22 preferably have substantially the same construction and operation as the QC station 90. Quality control (QC) panels (not shown) having substantially the same construction and operation as the QC panel 102 are disposed proximate to the QC stations 112–116 and the other QC stations in the machining line 22, respectively. These QC panels are operably connected to control systems for the second autoloader 28, the autoloaders 30, 32 and the other autoloaders, and interact with the control systems in substantially the same manner that the QC panel 102 interacts with the control system 40. In this regard, it should be noted that the control systems for the second autoloader 28, the autoloaders 30, 32 and the other autoloaders have substantially the same construction and operation as the control system 40.

The control system 40 for the autoloader comprises a programmable logic controller (PLC). A Q series PLC from Mitsubishi Automation, and, more specifically, a Mitsubishi Q2AS CPU s-1, has been found suitable for use as the PLC. The PLC includes a base unit having a plurality of power, processing and input/out (I/O) modules mounted therein. More specifically, the base unit includes a CPU module, a power supply module, one or more input modules, one or more output modules and one or more positioning modules that are connected together by a plurality of internal buses. The input, output and positioning modules are electrically connected by wiring to the carriage 50, the shutter doors 64 and other devices in the zone 20 and are operable to transmit and receive signals to and from the foregoing. More specifically, the input module(s) are connected by wiring to the contacts of the shutter doors 64 and other devices to receive status information therefrom, while the output modules are connected by wiring to the drive means for the lowerator 56 and other devices to provide commands thereto. The positioning module(s) are connected to the servo motor for the carriage 50 and other servo devices of the autoloader 10 to control the same in conjunction with commands from the CPU module.

The CPU module implements control strategies for the autoloader utilizing a control program written in a PLC language or a combination of PLC languages. Suitable PLC languages include ladder diagram, structured text, function block diagram, instruction list and sequential function (or flow) chart (SFC) and combinations of the foregoing. Preferably, the control program and the PLC language(s) are compatible with IEC61131 standards. When a Mitsubishi Q2AS CPU s-1 is used, a ladder diagram language that utilizes function blocks (application instructions) may be used as the PLC language. One of the application instructions that is used in the present invention is known as the FIFW instruction, which creates a data table and writes data to the end of the table with each execution of the instruction. A software package available from Mitsubishi Automation under the tradename GPP-WIN is used to program a Mitsubishi Q2AS CPU s-1 PLC.

The control system 40 is connected to by the wiring 62 to the carriage 50 for transmitting and receiving control signals to and from the carriage 50. The control system 40 is operable to control the movement of the carriage 50 along the monorail 52 and to control the operation of the lowerator 56 and the grippers 58, 60. With regard to each of the workstations MC1–MC4, the control system 40 is operable to control the carriage 50 and the grippers 58, 60 such that the carriage 50 can load and unload workstation MC1 in the manner described below. First, the gripper 58 grasps a workpiece in the input area 66 and then the lowerator 56 (with the workpiece) moves upward to the travel position. While the lowerator 56 is in the travel position, the carriage 50 moves to the workstation MC1. The lowerator 56 then moves downward to the servicing position, wherein the grippers 58, 60 enter the workstation MC1 through the entrance area. The gripper 60 grasps a worked-upon workpiece that is already present in the workstation MC1 and then removes the worked-upon workpiece from the workstation MC1. The gripper 58 loads the workpiece from the input area 66 into the workstation MC1 and then the lowerator 56 (with the worked-upon workpiece) moves upward into the travel position. While the lowerator 56 is in the travel position, the carriage 50 moves to the drop-off station 68. At the drop-off station 68, the lowerator 56 moves downward to the servicing position and the gripper 60 releases the worked-upon workpiece so as to deposit the worked-upon workpiece at the drop-off station 68. The worked-upon workpiece is then stamped by the stamping machine 80 with a stamp indicative of the workstation MC1.

The control program of the control system 40 controls the provision of workpieces to the workstations by the autoloader 10. Initially, it should be noted that in the control program, each of the workstations MC1–MC4 is assigned a tag in the form of a unique fixed number. Whenever the control system 40 receives a call signal from one of the workstations MC1–MC4, the control program enters the tag for the workstation that transmitted the call signal into a FIFO data table (at step 125 of the supply routine 120 described below) using an FIFW application instruction. As set forth above, the FIFW instruction enters the tag at the end of the FIFO data table. In this manner, tags in the data table are arranged in chronological order, i.e., the workstation tag for the oldest received call signal is disposed at the beginning of the data table. Whenever the control system 40 receives an error signal from a workstation whose tag is entered in the FIFO data table, the control program removes the tag from the FIFO data table.

Figure 5:
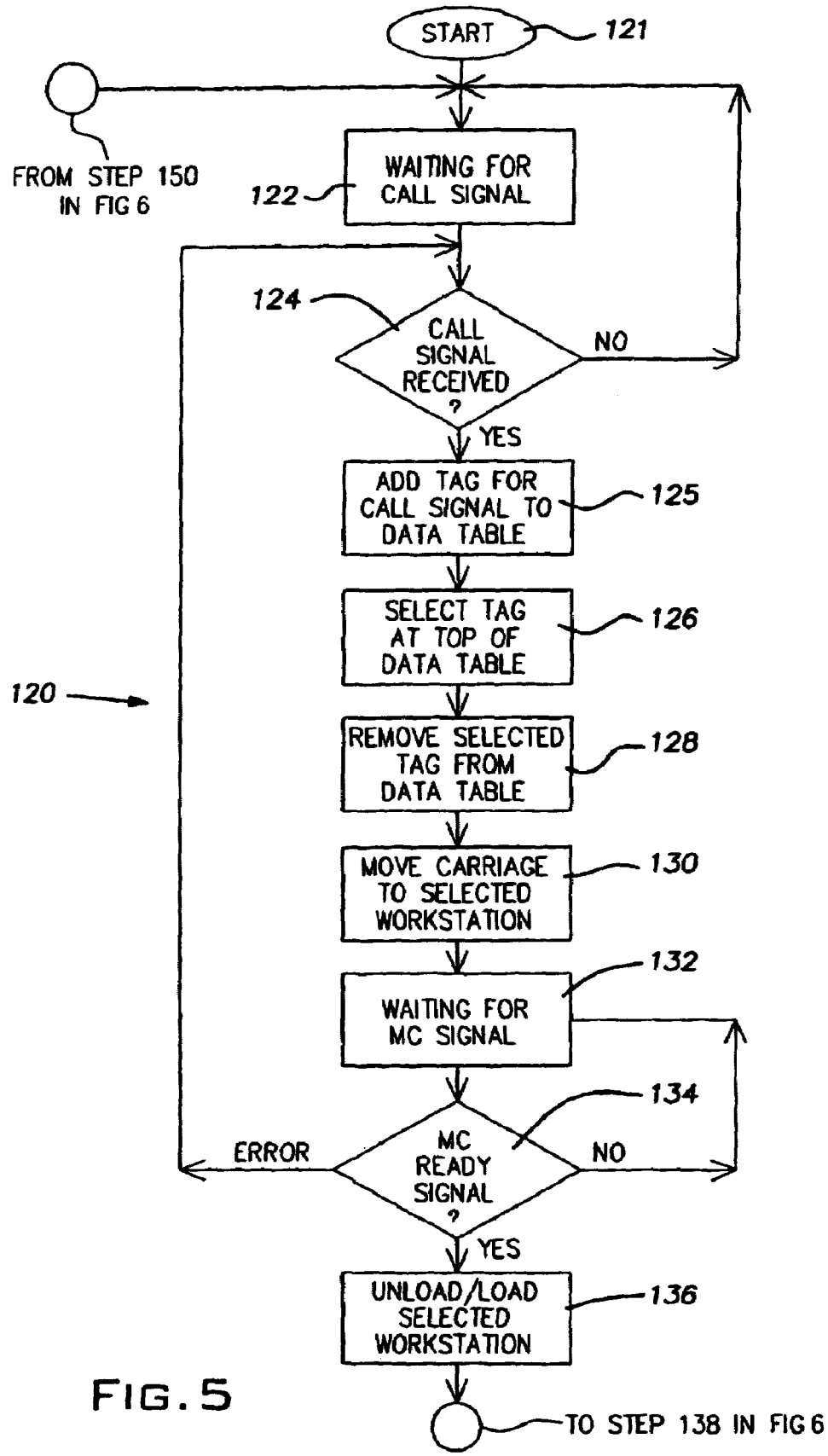
FIG. 5 shows a flow chart of a portion of a supply routine.
Figure 6:
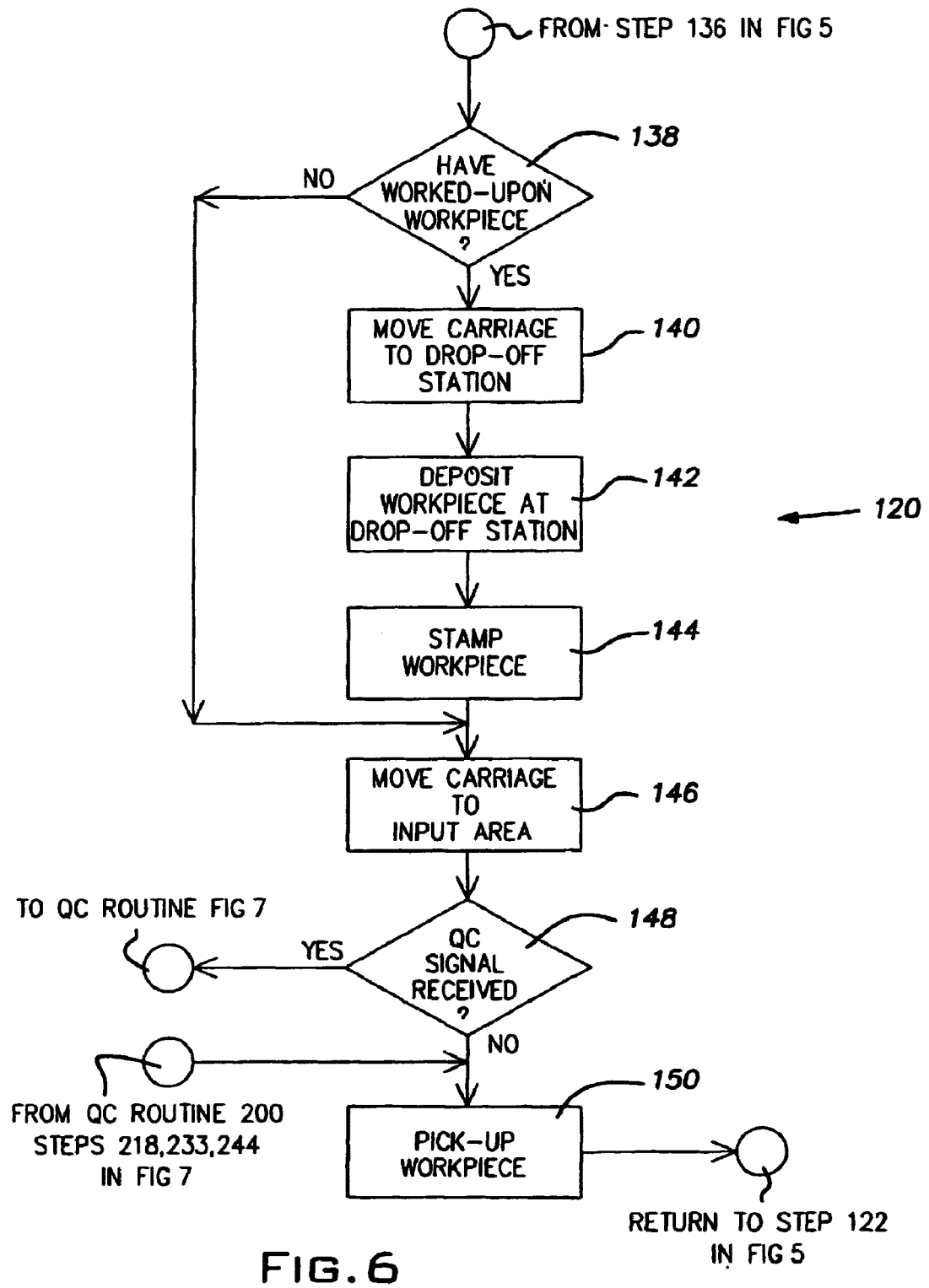
FIG. 6 shows a flow chart of another portion of the supply routine.

The control program controls the provision of workpieces to the workstations MC1–MC4 in accordance with the order in which call signals are received from the workstations MC1–MC4. More specifically, the control program in the CPU module controls the autoloader 10 using a supply routine 120 depicted by the flowchart shown in FIGS. 5 and 6. At step 121, the supply routine 120 initiates. At step 122, the autoloader 10 is located in the input area 66, the gripper 58 is holding a selected one of the workpieces and the supply routine 120 looks for a call signal from one of the workstations MC1–MC4. Next, in decision step 124, the supply routine 120 determines if a call signal from a workstation has been received. If the supply routine 120 determines that a call signal has not been received, the supply routine 120 moves back to step 122. If a call signal has been received, the supply routine 120 moves to step 125, where the supply routine 125 enters the tag for the workstation that transmitted the call signal into the FIFO data table. At step 126, the supply routine 120 selects the tag at the top of the FIFO data table (which corresponds to the oldest received call signal). At step 128, the selected tag is removed from the data table. Continuing, the supply routine 120 moves to step 130 and generates a movement command signal that is transmitted to the autoloader 10 and causes the carriage 50 to move to a waiting position located over a selected one of the workstations that corresponds to the selected tag. At step 132, the supply routine 120 looks to see if the control system 40 has received any signals from the selected workstation. Next, in decision step 134, the supply routine 120 determines if the control system 40 has received a ready signal, an error signal, or a shutter door 64 closed signal from the selected workstation. If the supply routine 120 determines that no signals have been received, the supply routine 120 moves back to step 132. If the supply routine 120 determines that an error signal or a shutter door 64 closed signal has been received, the supply routine 120 moves back to step 124 (however, the carriage 50 maintains its position over the current selected one of the workstations and remains there until another movement command signal is received from step 130). If the supply routine 120 determines that a ready signal has been received from the selected workstation, the supply routine 120 moves to step 136 and generates an unload/load command signal that is transmitted to the autoloader 10. In response to the unload/load command, the lowerator 56 moves downward to the servicing position. The gripper 60 then removes any worked-upon workpiece from the selected workstation and the gripper 58 loads the selected workpiece into the workstation. The lowerator 56 then moves upward to the travel position. Once the lowerator 56 is in the travel position, the supply routine 120 moves to decision step 138, wherein the supply routine 120 determines whether the gripper 60 has a worked-upon workpiece. If the supply routine 120 determines that the gripper 60 does not have a worked-upon workpiece, the supply routine 120 moves ahead to step 146. If the supply routine 120 determines that the gripper has a worked-upon workpiece, the supply routines 120 moves to step 140, wherein the supply routine 120 generates a second movement command that is transmitted to the autoloader 10 and causes the carriage 50 to move to the drop-off station 68. When the carriage 50 is at the drop-off station 68, the supply routine 120 moves to a subsequent step 142 and generates a deposit command that is transmitted to the autoloader 10. In response to the deposit command, the lowerator 56 moves downward to the servicing position and the gripper 60 deposits the worked-upon workpiece on the drop-off station 68. The lowerator 56 then moves upward to the travel position. At step 144, the supply routine 120 generates a stamp signal that is transmitted to the stamping machine 80 located at the drop-off station 68. In response to the stamp signal, the stamping machine 80 stamps the worked-upon workpiece with a mark indicating that the worked-upon workpiece was worked on by the selected workstation.

After step 144, the supply routine 120 moves to step 146 and generates a third movement command that is transmitted to the autoloader 10 and causes the carriage 50 to move to the input area 66. Once the carriage 50 is in the input area 66, the supply routine 120 moves to decision step 148, wherein the supply routine 120 determines whether a QC signal has been received. If the supply routine 120 determine that no QC signal has been received, the supply routine 120 moves to step 150 and generates a pick-up command that is transmitted to the autoloader 10. In response to the pick-up command, the lowerator 56 moves downward to the servicing position and the gripper 58 picks up another selected one of the workpieces from the input area 66. The lowerator 56 then moves upward to the travel position. At this point, the supply routine 120 moves back to step 122.

Figure 7:
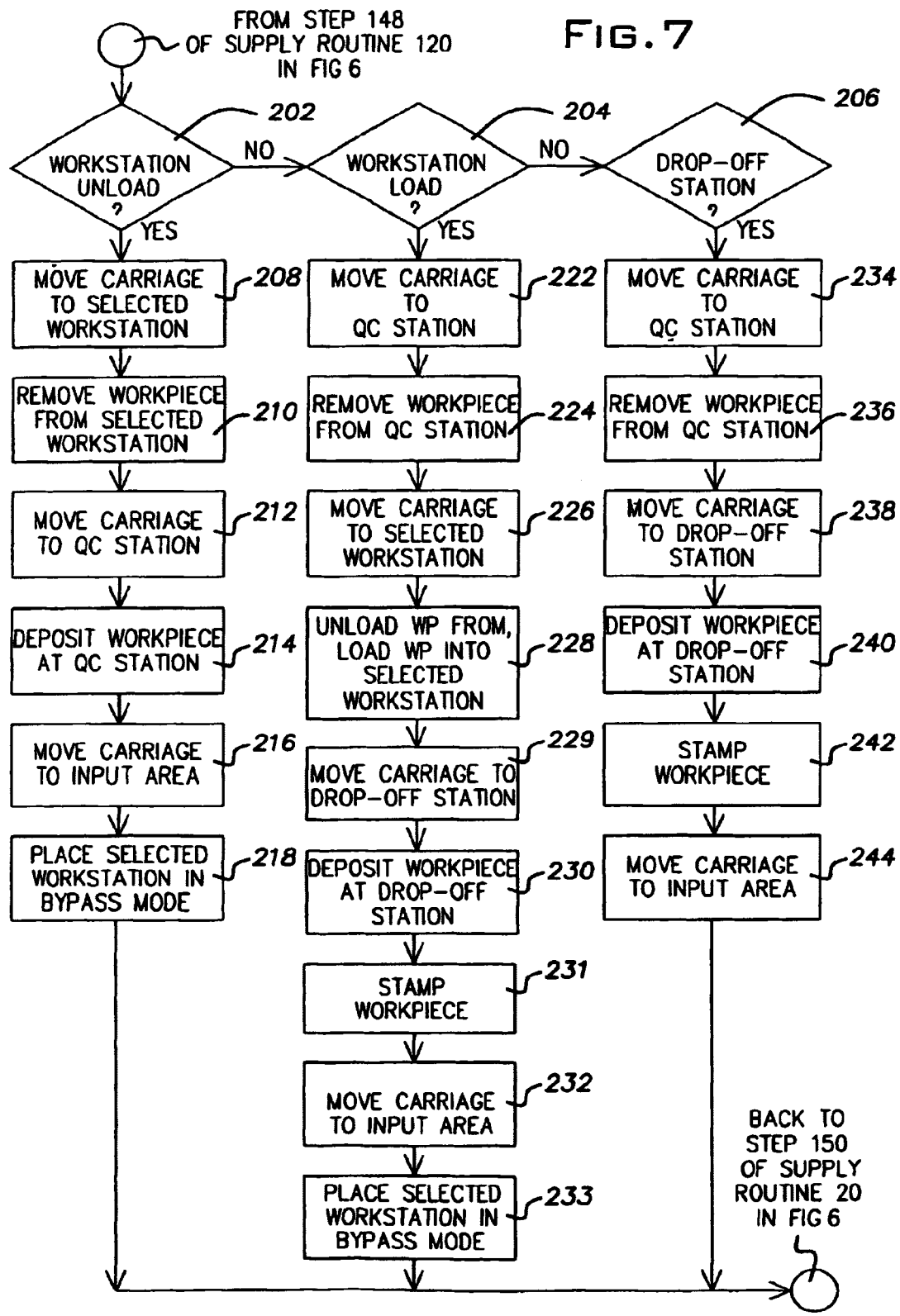
FIG. 7 shows a flow chart of a quality control routine.

If, at decision step 148, the supply routine 120 determines that a QC signal has been received, the control program moves to a QC routine 200 depicted by the flowchart shown in FIG. 7. At decision steps 202, 204, 206, the QC routine 200 respectively determines whether the QC signal is a workstation unload signal, a workstation load signal, or a drop-off signal.

If, at step 202, it is determined that a workstation unload signal is received, the QC routine 200 moves to step 208 and generates a QC movement command that is transmitted to the autoloader 10. In response to the QC movement command, the carriage 50 moves to a selected one of the workstations for which the workstation unload signal was transmitted. At step 210, the QC routine 200 generates and transmits a QC unload command to the autoloader 10, which causes the lowerator 56 to move downward to the servicing position. The gripper 58 then removes a to-be-inspected workpiece from the selected workstation and the lowerator 56 moves upward to the travel position. At step 212, the QC routine 200 generates and transmits a second QC movement command to the autoloader 10, which causes the carriage 50 to move to the QC station 90. Next, the QC routine 200 moves to step 214, wherein the QC routine 200 generates and transmits a QC deposit command, which causes the lowerator 56 to move downward to the servicing position. The gripper 58 then deposits the to-be-inspected workpiece at the QC station 90. The lowerator 56 then moves up to the travel position. At step 216, the QC routine 200 generates and transmits to the autoloader 10 a QC return command. In response, the carriage 50 moves to the input area 66. Once the carriage 50 is at the input area 66, the QC routine 200 moves to step 218, wherein the QC routine 200 places the selected workstation into bypass mode. After step 218, the control program moves back to step 150 of the supply routine 120.

If, at step 204, it is determined that a workstation load signal is received, the QC routine 200 moves to step 222 and generates a QC movement command that is transmitted to the autoloader 10. In response to the QC movement command, the carriage 50 moves to the QC station 90. Next, the QC routine 200 moves to step 224, wherein the QC routine 200 generates and transmits a QC removal command, which causes the lowerator 56 to move downward to the servicing position. The gripper 58 then removes a to-be-reworked workpiece from the QC station 90 and the lowerator 56 moves upward to the travel position. At step 226, the QC routine 200 generates and transmits a second QC movement command to the autoloader 10, which causes the carriage 50 to move to a selected one of the workstations for which the workstation load signal was transmitted. Next, the QC routine 200 moves to step 228; wherein the QC routine 200 generates and transmits a QC unload/load command, which causes the lowerator 56 to move downward to the servicing position. The gripper 60 then removes a worked-upon workpiece from the selected workstation and the gripper 58 deposits the to-be-reworked workpiece at the selected workstation. The lowerator 56 then moves up to the travel position. At step 229, the QC routine 200 generates and transmits a third QC movement command to the autoloader 10, which causes the carriage 50 to move to the drop-off station 68. Next, the QC-routine 200 moves to step 230, wherein the QC routine 200 generates and transmits a QC deposit command, which causes the lowerator 56 to move downward to the servicing position. The gripper 60 then deposits the worked-upon workpiece in the drop-off station 68. The lowerator 56 then moves up to the travel position. At step 231, the QC routine 200 generates a stamp signal that is transmitted to the stamping machine 80 located at the drop-off station 68. In response to the stamp signal, the stamping machine 80 stamps the worked-upon workpiece with a mark indicating that the worked-upon workpiece was worked on by the workstation for which the workstation load signal was transmitted. At step 232, the QC routine 200 generates and transmits to the autoloader 10 a QC return command. In response, the carriage 50 moves to the input area 66. Once the carriage 50 is at the input area 66, the QC routine 200 moves to step 233, wherein the QC routine 200 places the selected workstation into bypass mode. After step 233, the control program moves back to step 150 of the supply routine 120.

If, at step 206, it is determined that a drop-off signal is received, the QC routine 200 moves to step 234 and generates a QC movement command that is transmitted to the autoloader 10. In response to the QC movement command, the carriage 50 moves to the QC station 90. Next, the QC routine 200 moves to step 236, wherein the QC routine 200 generates and transmits a QC removal command, which causes the lowerator 56 to move downward to the servicing position. The gripper 58 then removes a compliant workpiece from the QC station 90 and the lowerator 56 moves upward to the travel position. At step 238, the QC routine 200 generates and transmits a second QC movement command to the autoloader 10, which causes the carriage 50 to move to the drop-off station 68. Next, the QC routine 200 moves to step 240, wherein the QC routine 200 generates and transmits a QC deposit command, which causes the lowerator 56 to move downward to the servicing position. The gripper 58 then deposits the compliant workpiece in the drop-off station 68. The lowerator 56 then moves up to the travel position. At step 242, the QC routine 200 generates a stamp signal that is transmitted to the stamping machine 80 located at the drop-off station 68. In response to the stamp signal, the stamping machine 80 stamps the compliant workpiece with a mark indicating that the compliant workpiece was worked on by the workstation for which the drop-off signal was transmitted. After step 242, the QC routine 200 moves to step 244, wherein the QC routine 200 generates a return command and transmits it to the autoloader 10, which causes the carriage 50 to move to the input area 66. Once the carriage 50 is at the input area 66, the control program moves back to step 150 of the supply routine 120.

Figure 8:
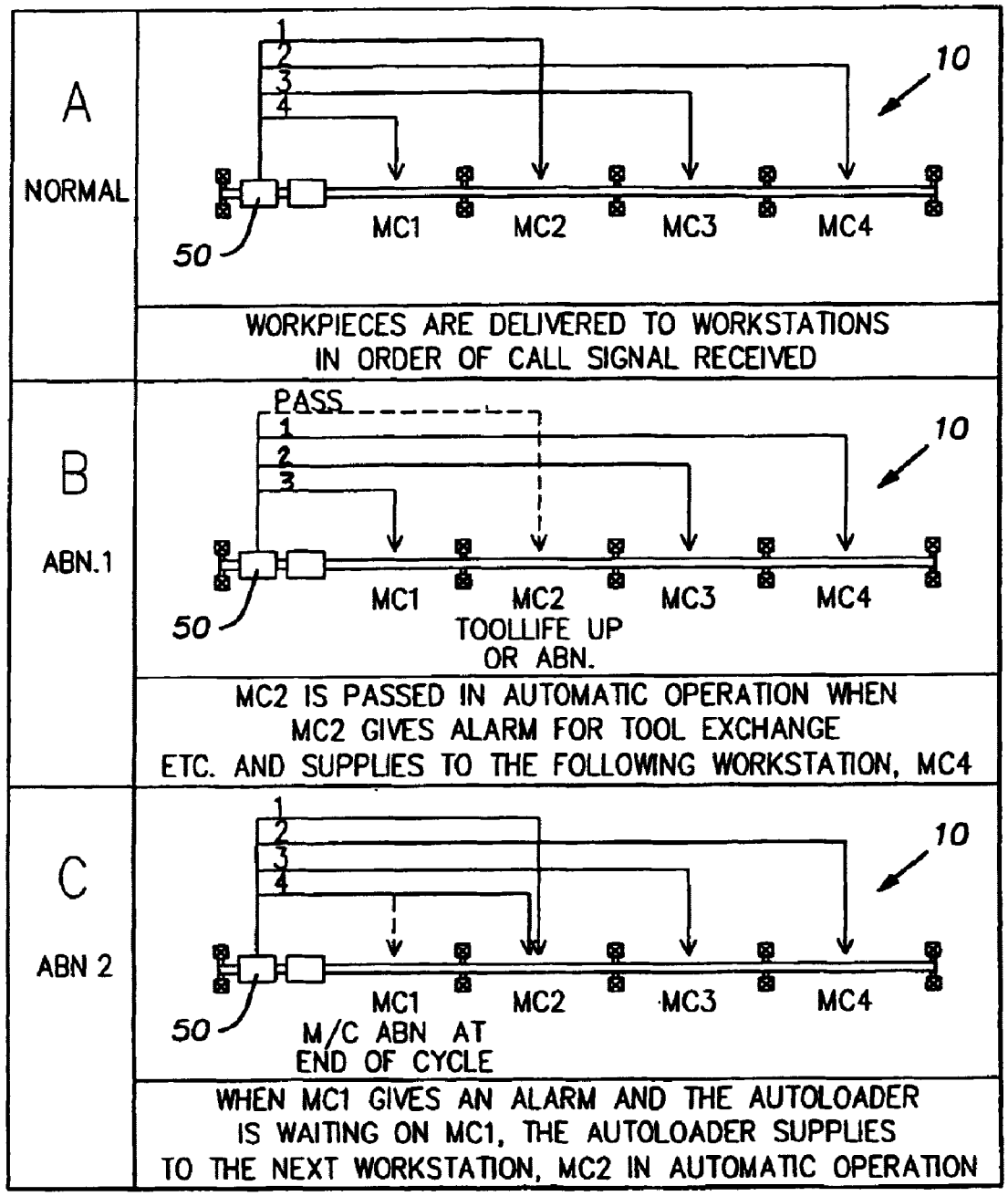
FIG. 8 is a diagram graphically showing how the supply routine operates.

The operation of the supply routine 120 will now be explained with reference to FIG. 8. In all of the frames A, B, C, call signals from the workstations MC1–MC4 are received by the control system 40 in the order MC2, MC4, MC3, MC1, MC2, MC4, MC3, MC1. In frame A, normal operation of the autoloader 10 is depicted. The control system 40 controls the autoloader 10 to supply the workstations MC1–MC4 with workpieces in the order in which the call signals are received, namely MC2, MC4, MC3, MC1. In frame B, MC2 sends an error signal to the control system 40 at the same time or very soon after it sends its call signal. The error signal causes the control program to remove the tag for MC2 from the FIFO data table. As a result, when the supply routine 120 moves to step 126 and selects the tag at the top of the FIFO data table, the supply routine 120 will select the tag for MC4 (which has now moved to the top, since the tag for MC2 has been removed). Accordingly, the control system 40 controls the autoloader 10 to supply workpieces in the order MC4, MC3, MC1. In frame C, MC1 sends an error signal to the control system 40 after the carriage 50 has moved to the waiting position over MC1 after step 130 of the supply routine 120. At step 132, however, the supply routine 120 finds the error signal. Therefore, at step 134, the supply routine 120 moves back to step 124. At step 126, supply routine 120 selects the tag currently at the top of the FIFO data table, which is the tag for MC2. Accordingly, the control system 40 controls the autoloader 10 to supply workpieces in the order MC2, MC4, MC3, MC2.

As can be appreciated from the foregoing, the control program allows faster machines to be serviced more often. In addition, the control program allows the autoloader 10 to continue running if a workstation stops, even if the carriage 50 was positioned over the workstation and ready to deliver a workpiece.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of supplying workpieces to a plurality of workstations, each of said workstations being operable to generate and transmit a call signal, a ready signal, and an error signal, said method comprising the steps of:
    (a.) receiving all call, ready and error signals transmitted from the workstations;
    (b.) for all received call signals, determining a selected one of the call signals, which is the oldest one of the call signals that has not been responded to and has not come from a workstation that has also transmitted an error signal;
    (c.) responding to the selected one of the call signals by moving a selected one of the workpieces from an input area to a selected one of the workstations, which is the workstation that transmitted the selected one of the call signals;
    (d.) determining if a ready signal or an error signal has been received from the selected one of the workstations;
    (e.) if an error signal has been received from the selected one of the workstations, returning directly to step (b.);
    (f.) if neither a ready signal, nor an error signal has been received from the selected one of the workstations, returning to step (d.); and
    (g.) if a ready signal has been received from the selected one of the workstations, loading the selected one of the workpieces into the selected one of the workstations; and
    (h.) returning to step (b.).

2. The method of claim 1, wherein step (g.) further comprises the substep of unloading a worked-upon one of the workpieces from the selected one of the workstations before the selected one of the workpieces is loaded into the selected one of the workstations.

3. The method of claim 2, further comprising:
    step (i.) moving the worked-upon one of the workpieces to a drop-off station;
    and wherein step (i.) is performed between steps (g.) and (h.).

4. The method of claim 1, wherein step (a.) comprises the non-sequential sub-steps of (a1.) receiving a call signal, (a2.) receiving an error signal, and (a3.) receiving a ready signal, and wherein
    sub-step (a1) is performed any time during the performance of the method when one of the workstations transmits a call signal;
    sub-step (a2) is performed any time during the performance of the method when one of the workstations transmits an error signal; and
    sub-step (a3) is performed any time during the performance of the method when one of the workstations transmits a ready signal.

5. The method of claim 1, wherein the oldest one of the call signals is determined based upon the time of receipt of the call signals.

6. The method of claim 1, wherein steps (c.) and (g.) are performed by an autoloader.

7. The method of claim 1, wherein the workstations all perform the same type of operation on the workpieces.

8. The method of claim 1, wherein the workpieces are unfinished crankshafts.

9. A method of controlling an autoloader that supplies workpieces to a plurality of workstations, wherein the autoloader comprises a carriage mounted to a guidance structure and moveable along the length of the guidance structure, said carriage including at least one gripper, and wherein each of said workstations is operable to generate and transmit a call signal, a ready signal, and an error signal, and wherein said method comprises the steps of:
    (a.) receiving all call, ready and error signals transmitted from the workstations;
    (b.) for all received call signals, determining a selected one of the call signals, which is the oldest one of the call signals that has not been responded to and has not come from a workstation that has also transmitted an error signal;
    (c.) moving the carriage to the input area;
    (d.) using the at least one gripper, picking up and holding a selected one of the workpieces in the input area;
    (e.) responding to the selected one of the call signals by moving the carriage with the selected one of the workpieces to a selected one of the workstations, which is the workstation that transmitted the selected one of the call signals;

(f.) determining if a ready signal or an error signal has been received from the selected one of the workstations;

(g.) if an error signal has been received from the selected one of the workstations, returning to step (b.); and (h.) if neither a ready signal, nor an error signal has been received from the selected one of the workstations, returning to step (f.);

(i.) if a ready signal has been received from the selected one of the workstations, loading the selected one of the workpieces into the selected one of the workstations, using the at least one gripper; and (j.) returning to step (b.).

10. The method of claim 9, wherein step (i.) further comprises the substep of using the at least one gripper to unload a worked-upon one of the workpieces from the selected one of the workstations before the selected one of the workpieces is loaded into the selected one of the workstations.

11. The method of claim 10, further comprising the steps of (k.) moving the carriage with the worked-upon one of the workpieces to a drop-off station; and (l.) depositing the worked-upon one of the workpieces in the drop-off station, using the at least one gripper; and wherein steps (k.) and (l.) are performed between step (i.) and step (j.).

12. The method of claim 11, wherein in an initial cycle of the method, steps (c.) and (d.) are performed before step (b.) and in subsequent cycles of the method, steps (c.) and (d.) are performed after steps (k.) and (l.) and before step (j.).

13. The method of claim 12, wherein the at least one gripper comprises a pair of grippers for holding the selected one of the workpieces and the worked-upon one of the workpieces, respectively.

14. The method of claim 9, wherein step (a.) comprises the non-sequential sub-steps of (a1.) receiving a call signal, (a2.) receiving an error signal, and (a3.) receiving a ready signal, and wherein sub-step (a1) is performed any time during the performance of the method when one of the workstations transmits a call signal;

sub-step (a2) is performed any time during the performance of the method when one of the workstations transmits an error signal; and sub-step (a3) is performed any time during the performance of the method when one of the workstations transmits a ready signal.

15. The method of claim 9, wherein the oldest one of the call signals is determined based upon the time of receipt of the call signals.

16. The method of claim 9, wherein the workstations all perform the same type of operation on the workpieces.

17. The method of claim 9, wherein the workpieces are automotive crankshafts.

18. A method of moving a workpiece through a work line comprising a plurality of zones, wherein each zone comprises a plurality of workstations that perform the same type of operation, and wherein each workstation is operable to generate and transmit a call signal, error signal and ready signal, said method comprising the steps of:

(a.) receiving all call and error signals transmitted from the workstations in a first one of the zones;

(b.) for all received call signals from the workstations in the first one of the zones, determining a selected one of the call signals, which is the oldest one of the call signals that has not been responded to and has not come from a workstation that has also transmitted an error signal;

(c.) responding to the selected one of the call signals by moving the workpiece from a first input area to a selected one of the workstations in the first one of the zones, which is the workstation that transmitted the selected one of the call signals;

(d.) working on the workpiece in the selected one of the workstations;

(e.) after step (d.), moving the workpiece to a second input area;

(f.) receiving all call and error signals transmitted from the workstations in a second one of the zones; and (g.) for all received call signals from the workstations in the second one of the zones, determining a second selected one of the call signals, which is the oldest one of the call signals that has not been responded to and has not come from a workstation that has also transmitted an error signal;

(h.) responding to the second selected one of the call signals by moving the workpiece from the second input area to a second selected one of the workstations in the second one of the zones, which is the workstation that transmitted the second selected one of the call signals;

(i.) working on the workpiece in the second selected one of the workstations:

(j.) after step (i.), moving the workpiece to a third input area:

(k.) determining if a ready signal or an error signal has been received from the selected one of the workstations;

(l.) if an error signal has been received from the selected one of the workstations, returning directly to step (b.);

(m.) if neither a ready signal, nor an error signal has been received from the selected one of the workstations, returning to step (k.); and (n.) if a ready signal has been received from the selected one of the workstations, loading the workpiece into the selected one of the workstations;

(o.) determining if a ready signal or an error signal has been received from the second selected one of the workstations;

(p.) if an error signal has been received from the second selected one of the workstations, returning directly to step (g.);

(q.) if neither a ready signal, nor an error signal has been received from the second selected one of the workstations, returning to step (o.); and (r.) if a ready signal has been received from the second selected one of the workstations, loading the workpiece into the second selected one of the workstations; and wherein steps (k.), (l.), (m) and (n) are performed between steps (c.) and (d.), and wherein steps (o.), (p.), (q.) and (r.) are performed between steps (h.) and (i.).

19. The method of claim 18, wherein step (a.) comprises the non-sequential sub-steps of (a1.) receiving a call signal, (a2.) receiving an error signal, and (a3.) receiving a ready signal, wherein:

sub-step (a1) is performed any time during the performance of the method when one of the workstations in the first one of the zones transmits a call signal;

sub-step (a2) is performed any time during the performance of the method when one of the workstations in the first one of the zones transmits an error signal; and sub-step (a3) is performed any time during the performance of the method when one of the workstations in the first one of the zones transmits a ready signal; and wherein step (f.) comprises the non-sequential sub-steps of (f1.) receiving a call signal, (f2.) receiving an error signal, and (f3.) receiving a ready signal, and wherein:

sub-step (f1) is performed any time during the performance of the method when one of the workstations in the second one of the zones transmits a call signal;

sub-step (f2) is performed any time during the performance of the method when one of the workstations in the second one of the zones transmits an error signal; and sub-step (f3) is performed any time during the performance of the method when one of the workstations in the second one of the zones transmits a ready signal.

20. A method of moving a workpiece through a work line comprising a plurality of zones, wherein each zone comprises a plurality of workstations that perform the same type of operation, and wherein each workstation is operable to generate and transmit a call signal and an error signal, said method comprising the steps of:

(a.) receiving all call and error signals transmitted from the workstations in a first one of the zones;

(b.) for all received call signals from the workstations in the first one of the zones, determining a selected one of the call signals, which is the oldest one of the call signals that has not been responded to and has not come from a workstation that has also transmitted an error signal;

(c.) responding to the selected one of the call signals by moving, using a first autoloader, the workpiece from a first input area to a selected one of the workstations in the first one of the zones, which is the workstation that transmitted the selected one of the call signals;

(d.) working on the workpiece in the selected one of the workstations;

(e.) after step (d.), moving the workpiece to a second input area;

(f.) receiving all call and error signals transmitted from the workstations in a second one of the zones; and (g.) for all received call signals from the workstations in the second one of the zones, determining a second selected one of the call signals, which is the oldest one of the call signals that has not been responded to and has not come from a workstation that has also transmitted an error signal;

(h.) responding to the second selected one of the call signals by moving, using a second autoloader, the workpiece from the second input area to a second selected one of the workstations in the second one of the zones, which is the workstation that transmitted the second selected one of the call signals;

(i.) working on the workpiece in the second selected one of the workstations; and (j.) after step (i.), moving the workpiece to a third input area.

21. The method of claim 20, wherein the workstations in the first one of the zones performs a different operation than the workstations in the second one of the zones.

* * * * *